US012591850B1

(12) United States Patent
Sharma et al.

(10) Patent No.: US 12,591,850 B1
(45) Date of Patent: Mar. 31, 2026

(54) SYSTEM AND METHOD OF REVERSE SOURCING OF PRODUCT RETURNS BASED ON RESTORAGE COST MODELS

(71) Applicant: Blue Yonder Group, Inc., Scottsdale, AZ (US)

(72) Inventors: Abhijeet Sharma, Khandwa (IN); Mayank Tiwari, Serilingampalle (IN); Pankaj Rathoure, Shajapur (IN); Priyanka Koushik, Irving, TX (US); Raghuveer Prasad Nagar, Kota (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 59 days.

(21) Appl. No.: 18/662,490

(22) Filed: May 13, 2024

Related U.S. Application Data

(60) Provisional application No. 63/531,135, filed on Aug. 7, 2023, provisional application No. 63/529,568, filed on Jul. 28, 2023, provisional application No. 63/529,068, filed on Jul. 26, 2023.

(51) Int. Cl.
    *G06Q 10/087* (2023.01)
(52) U.S. Cl.
    CPC .................................. *G06Q 10/087* (2013.01)
(58) Field of Classification Search
    CPC .................................................... G06Q 10/087
    See application file for complete search history.

(56) References Cited

U.S. PATENT DOCUMENTS

| | | | | |
|---|---|---|---|---|
| 9,652,732 | B1 * | 5/2017 | Barstad | ............. G06Q 10/0837 |
| 10,318,921 | B1 * | 6/2019 | Tilly | .................... G06Q 20/203 |
| 11,030,674 | B2 * | 6/2021 | Nair | .................. G06Q 30/0206 |
| 11,205,181 | B2 * | 12/2021 | Agasti | .................. G06Q 20/407 |
| 2004/0117384 | A1 * | 6/2004 | Ray | ........................ G06Q 20/04 |
| 2005/0171827 | A1 * | 8/2005 | Denton | ........... G06Q 10/06312 |
| | | | | 705/7.29 |
| 2006/0149577 | A1 * | 7/2006 | Stashluk, Jr. | ........ G06Q 30/016 |
| | | | | 705/13 |
| 2006/0271422 | A1 * | 11/2006 | Rakesh | .................. G06Q 10/06 |
| | | | | 705/7.31 |

(Continued)

FOREIGN PATENT DOCUMENTS

| | | |
|---|---|---|
| WO | 2001057613 A2 | 8/2001 |
| WO | WO-2021169553 A1 * | 9/2021 .......... G06Q 30/012 |

*Primary Examiner* — Michael Jared Walker
(74) *Attorney, Agent, or Firm* — Spencer Fane LLP; Steven J. Laureanti

(57) ABSTRACT

A system and method are disclosed for modeling restorage cost for reverse sourcing of regular items. The method includes detecting a return request from a customer for an item, identifying a supply type for the item, predicting a demand for the item at potential restorage sites in a supply chain network, deriving a likelihood of potential restorage sites meeting service level agreements, and calculating a restorage cost for each of the potential restorage sites, and based on the calculated restorage costs, recommend a restorage plan to a user, where the recommended restorage plan is based, at least in part, on a threshold value of the item. The method further includes identifying the potential restorage sites based, at least in part, on a geographic range and assigning a manual quality check to verify a condition of the item.

20 Claims, 7 Drawing Sheets

(56) References Cited

U.S. PATENT DOCUMENTS

| | | | |
|---|---|---|---|
| 2010/0318207 A1* | 12/2010 | Yee | G06Q 10/08 |
| | | | 705/28 |
| 2014/0129391 A1* | 5/2014 | Kreuels | G06Q 10/083 |
| | | | 705/26.81 |
| 2017/0293886 A1* | 10/2017 | Bostick | G06Q 10/08355 |
| 2021/0042699 A1* | 2/2021 | Lee | G06Q 10/08 |
| 2021/0150616 A1* | 5/2021 | Kentris | G06Q 10/0837 |
| 2022/0012677 A1* | 1/2022 | Rongley | G06K 7/10297 |
| 2022/0198377 A1* | 6/2022 | Cho | G06Q 10/0837 |
| 2023/0237425 A1* | 7/2023 | Puthiyapurayil | G06Q 10/087 |
| | | | 705/28 |
| 2023/0419244 A1* | 12/2023 | Sood | G06Q 10/08355 |

* cited by examiner

300

302 — DETECT REQUEST TO RETURN AN ITEM TO A SELLER

304 — EVALUATE OPTIONS WITHIN SUPPLY CHAIN NETWORK ASSOCIATED WITH SELLER

306 — RECOMMEND OPTIMAL RESTORAGE SITE FOR RESTORAGE

400

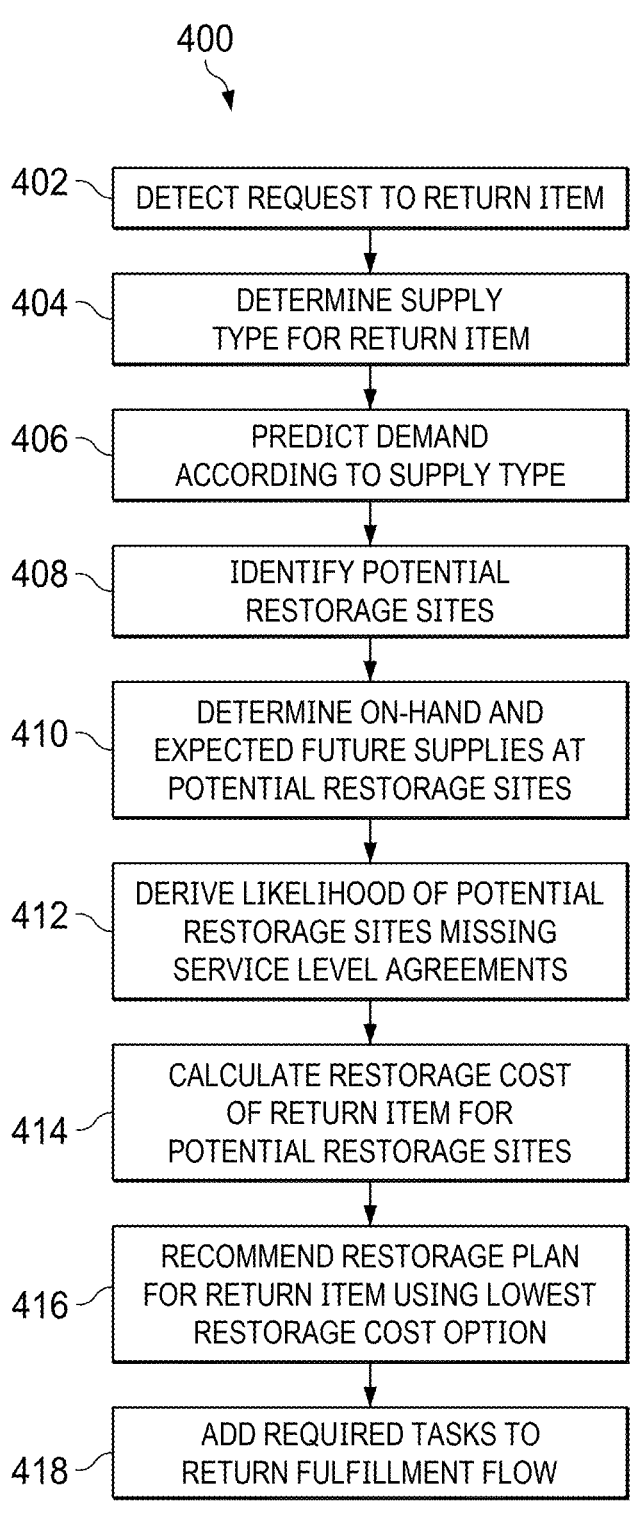

402 — DETECT REQUEST TO RETURN ITEM

404 — DETERMINE SUPPLY TYPE FOR RETURN ITEM

406 — PREDICT DEMAND ACCORDING TO SUPPLY TYPE

408 — IDENTIFY POTENTIAL RESTORAGE SITES

410 — DETERMINE ON-HAND AND EXPECTED FUTURE SUPPLIES AT POTENTIAL RESTORAGE SITES

412 — DERIVE LIKELIHOOD OF POTENTIAL RESTORAGE SITES MISSING SERVICE LEVEL AGREEMENTS

414 — CALCULATE RESTORAGE COST OF RETURN ITEM FOR POTENTIAL RESTORAGE SITES

416 — RECOMMEND RESTORAGE PLAN FOR RETURN ITEM USING LOWEST RESTORAGE COST OPTION

418 — ADD REQUIRED TASKS TO RETURN FULFILLMENT FLOW

SYSTEM AND METHOD OF REVERSE SOURCING OF PRODUCT RETURNS BASED ON RESTORAGE COST MODELS

CROSS-REFERENCE TO RELATED APPLICATIONS

The present disclosure is related to that disclosed in U.S. Provisional Application No. 63/531,135, filed Aug. 7, 2023, entitled "Systems and Methods of Supply Distribution Optimization Driven Reverse Logistics," U.S. Provisional Application No. 63/529,568, filed Jul. 28, 2023, entitled "Bundle Return Optimization System," and U.S. Provisional Application No. 63/529,068, filed Jul. 26, 2023, entitled "Reverse Sourcing of Product Returns Based on Restorage Cost Models." U.S. Provisional Application Nos. 63/531,135, 63/529,568, and 63/529,068 are assigned to the assignee of the present application. The present invention hereby claims priority under 35 U.S.C. § 119(e) to U.S. Provisional Application Nos. 63/531,135, 63/529,568, and 63/529,068.

TECHNICAL FIELD

The present disclosure relates generally to supply chain logistics and more specifically to reverse sourcing product returns in a supply chain network.

BACKGROUND

Enterprises often accept returns of items from customers to increase sales and maintain customer satisfaction, among other reasons. The logistics of returns are typically organized and managed by a reverse logistics system, which may determine a restorage site in a supply chain to receive and store the return item. The cost incurred from a return may vary among restorage sites based on various factors, including, for example, transportation and storage costs of the return item, the condition of the return item, and the demand for the return item. However, existing reverse logistics systems determine which restorage sites to receive returns based on static rules, such as the distance to the restorage site, the source restorage site, or quality control and receiving enablement of the restorage site. Moreover, existing reverse logistics systems determine the restorage sites within the context of the return logistics without regard to other supply chain contexts, such as the supply and demand of the return item at the restorage sites. Use of existing fulfillment systems thus results in increases in overhead, costs incurred by returns, time required to complete returns, and lost sales, as well as reduced customer satisfaction, all of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

2

Figure 5:
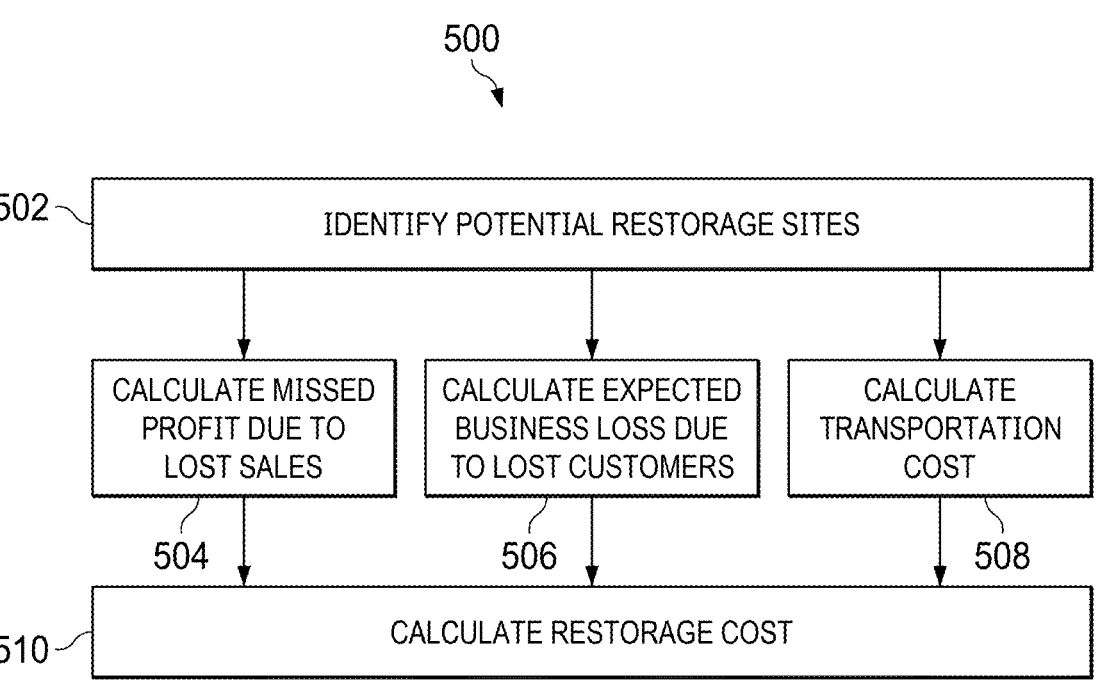
Figure 6:
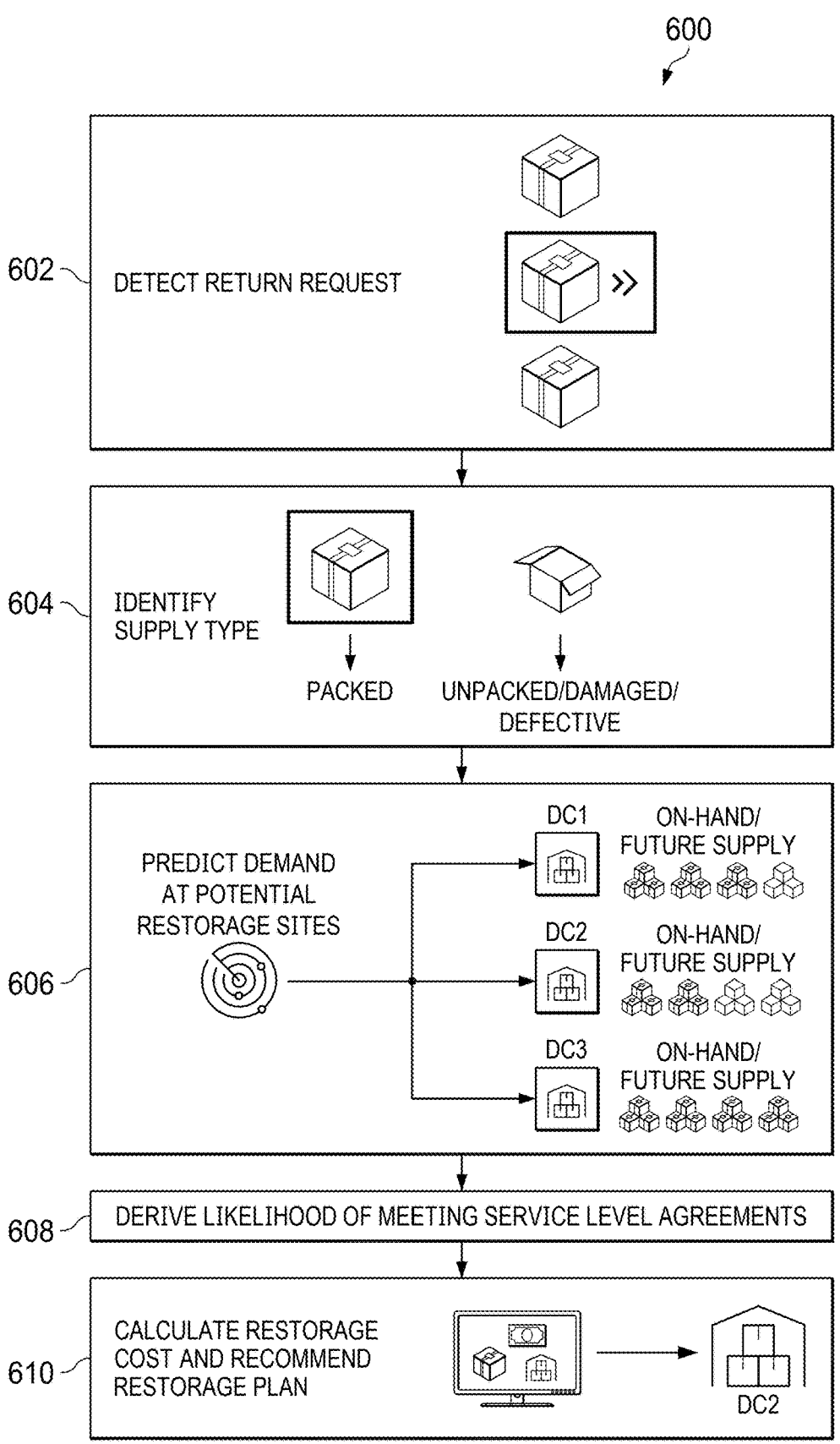
Figure 7:
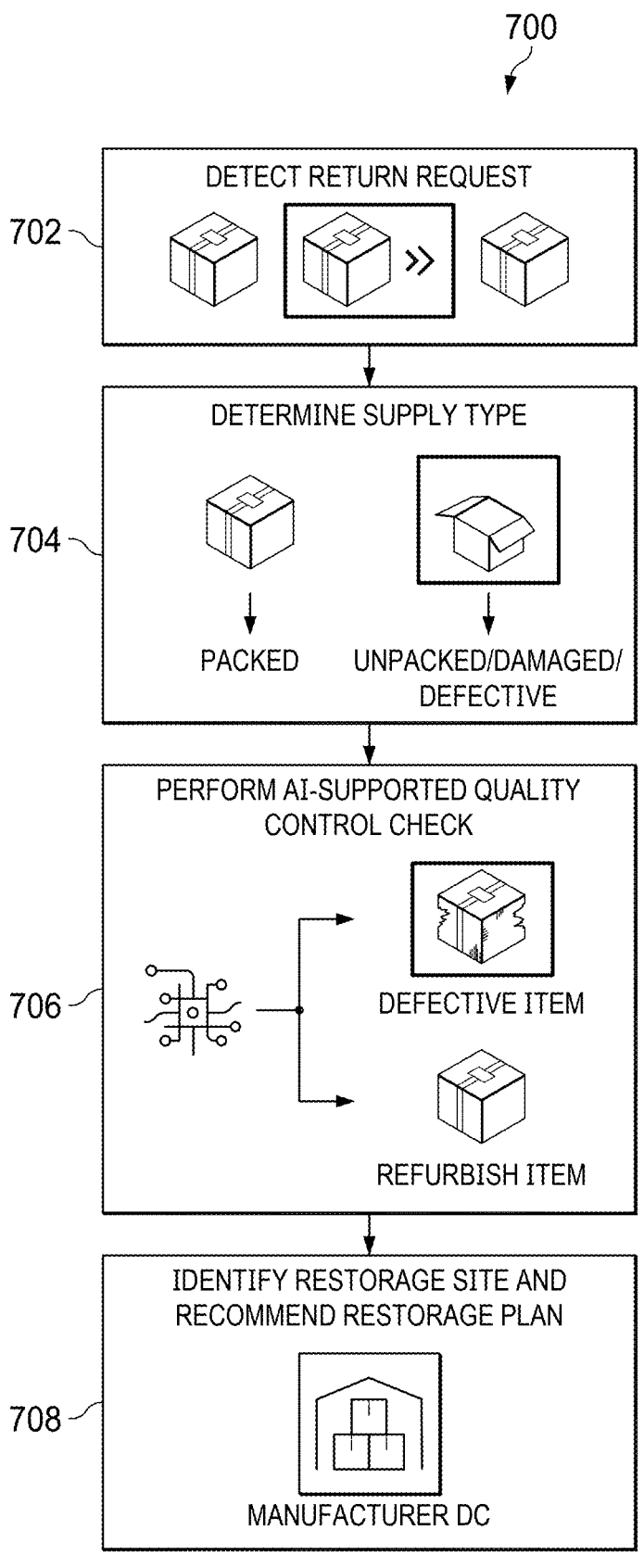

FIG. 4 illustrates a method for modeling restorage costs for reverse sourcing accordance with an embodiment;

FIG. 5 illustrates a method for calculating restorage costs, in accordance with an embodiment;

FIG. 6 illustrates an example method for modeling restorage cost for reverse sourcing of regular items, in accordance with an embodiment; and FIG. 7 illustrates an example method for modeling the impact of restorage costs for reverse sourcing of defective items, in accordance with an embodiment.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide systems and methods for recommending one or more optimal restorage sites of a supply chain for a return item that was purchased from a seller of the supply chain. Embodiments automatically evaluate options for restorage of the return item as the return is requested. Systems and methods disclosed herein may provide a seamless flow for bundles and components for returns and provide more cost-effective return processes by calculating a restorage cost for the returned products while considering various reverse logistics costs, such as assembly status, predicted demand for the return item, impacted customers, and transportation costs.

Embodiments of the following disclosure enable systems and methods to optimize the process of returning orders by reducing time required to identify supply types for returns, as well as making return processes more efficient, more cost effective, and less time-consuming. Use of embodiments may reduce congestion at return hubs that may be present when using existing product return systems. Use of embodiments may further improve overall demand fulfillment of the supply chain by restoring items at nodes that are most in need of such items, which may in turn improve customer loyalty and satisfaction.

Figure 1:
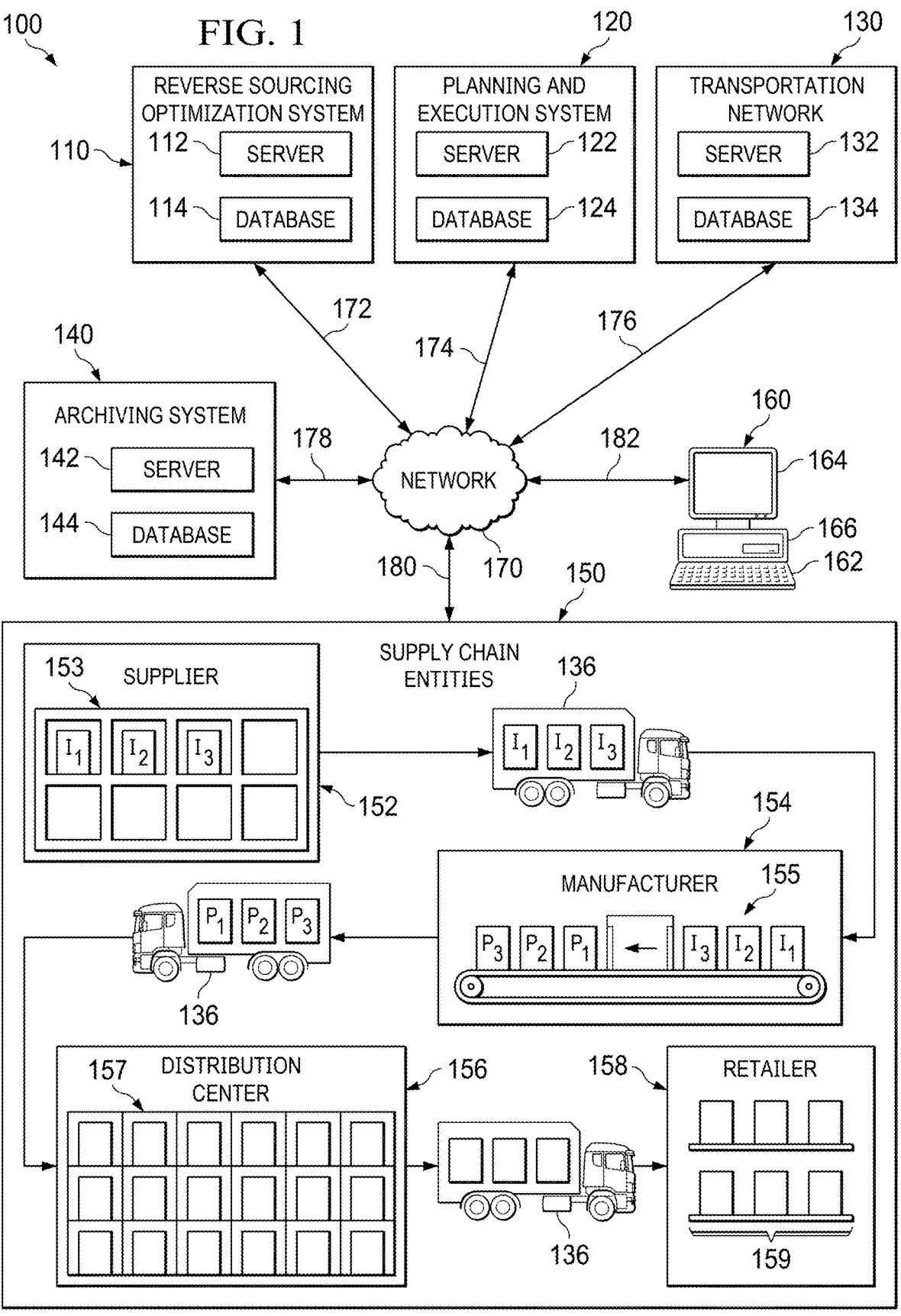
FIG. 1 illustrates a supply chain network, in accordance with a first embodiment.

FIG. 1 illustrates supply chain network 100, in accordance with a first embodiment. Supply chain network 100 comprises reverse sourcing optimization system 110, planning and execution system 120, transportation network 130, archiving system 140, one or more supply chain entities 150, one or more computers 160, network 170, and one or more communication links 172-182. Although a single reverse sourcing optimization system 110, a single planning and execution system 120, a single transportation network 130, a single archiving system 140, one or more supply chain entities 150, one or more computers 160, a single network 170, and one or more communication links 172-182 are shown and described, embodiments contemplate any number of reverse sourcing optimization systems, planning and execution systems, transportation networks, archiving systems, supply chain entities, computers, networks, or communication links, according to particular needs.

In one embodiment, reverse sourcing optimization system 110 comprises server 112 and database 114. Although reverse sourcing optimization system 110 is shown as comprising a single server 112 and a single database 114, embodiments contemplate reverse sourcing optimization system 110 including any suitable number of servers, databases, serverless computing options, or data stores internal to, or externally coupled with, reverse sourcing optimization system 110, according to particular needs. For the purposes of this disclosure, all instances of "server" are understood to include, according to embodiments, one or more embodiments of servers, serverless computing options, and/or other computing solutions, and all instances of "database" are understood to include, according to embodiments, databases, datastores, data stores, and/or other data storage systems, according to particular needs. In embodiments, reverse sourcing optimization system 110 calculates a restorage cost for one or more items in a return to generate a restorage plan for the one or more items. As explained in further detail below, reverse sourcing optimization system 110 may detect a request to return an item, determine a supply type (or inventory classification) for the item, and predict demand for the determined supply type at one or more potential restorage sites. Reverse sourcing optimization system 110 may further derive the likelihood of the one or more potential restorage sites fulfilling the predicted demand and, based, at least in part, on the derived likelihood, calculates the restorage costs for potential restorage plans for the item.

According to an embodiment, planning and execution system 120 comprises server 122 and database 124. Supply chain planning and execution is typically performed by several distinct and dissimilar processes, including, for example, strategic assortment planning, demand planning, operations planning, production planning, supply planning, distribution planning, execution, pricing, forecasting, transportation management, warehouse management, inventory management, fulfilment, procurement, and the like. Server 122 of planning and execution system 120 comprises one or more modules, such as, for example, planning module 260 (FIG. 2), a solver, a modeler, and/or an engine, for performing actions of one or more planning and execution processes. Server 122 stores and retrieves data from database 124 or from one or more locations in supply chain network 100. In addition, planning and execution system 120 operates on one or more computers 160 that are integral to, or separate from, the hardware and/or software that support archiving system 140 and one or more supply chain entities 150. In an embodiment, server 122 of planning and execution system 120 is configured to receive and transmit item data, including item identifiers, pricing data, attribute data, inventory levels, and other like data about one or more items at one or more locations in supply chain network 100. Server 122 stores and retrieves item data from database 124 or one or more locations in supply chain network 100.

Transportation network 130 comprises server 132 and database 134. According to embodiments, transportation network 130 directs one or more transportation vehicles 136 to ship one or more items from one or more stocking locations of one or more supply chain entities 150. In embodiments, one or more transportation vehicles 136 comprise a truck fleet used for performing deliveries. In addition, the number of items shipped by one or more transportation vehicles 136 in transportation network 130 may also be based, at least in part, on the number of items currently in stock at one or more stocking locations of one or more supply chain entities 150, the number of items currently in transit, a forecasted demand, a supply chain disruption, and/or the like. One or more transportation vehicles 136 may comprise, for example, any number of trucks, cars, vans, boats, airplanes, unmanned aerial vehicles (UAVs), cranes, robotic machinery, or the like. According to embodiments, one or more transportation vehicles 136 may be associated with one or more supply chain entities 150 and may be directed by automated navigation including, for example, GPS guidance, according to particular needs.

Archiving system 140 of supply chain network 100 comprises server 142 and database 144. Although archiving system 140 is shown as comprising a single server 142 and a single database 144, embodiments contemplate any suitable number of servers or databases internal to, or externally coupled with, archiving system 140. Server 142 of archiving system 140 may support one or more processes for receiving and storing data from planning and execution system 120, one or more supply chain entities 150, and/or one or more computers 160 of supply chain network 100, as described in more detail herein. According to some embodiments, archiving system 140 comprises an archive of data received from planning and execution system 120, one or more supply chain entities 150, and/or one or more computers 160 of supply chain network 100. Archiving system 140 provides archived data to reverse sourcing optimization system 110 and/or planning and execution system 120 to, for example, train one or more machine learning models. Server 142 may store the received data in database 144. Database 144 of archiving system 140 may comprise one or more databases or other data storage arrangements at one or more locations local to, or remote from, server 142.

One or more supply chain entities 150 may represent one or more suppliers 152, one or more manufacturers 154, one or more distribution centers 156, and one or more retailers 158 in one or more supply chain networks, including one or more enterprises. Each of one or more supply chain entities 150 may comprise Internet of things (IoT) sensors, which may automatically transmit conditions (e.g., location, temperature, etc.) of any object to reverse sourcing optimization system 110 or any other system or device of supply chain network 100. The IoT sensors may transmit condition data periodically (e.g., every minute, every hour, or every day), or may transmit condition data in response to a change (e.g., a door of a container being opened or closed).

One or more suppliers 152 may be any suitable entity that offers to sell or otherwise provides one or more items or components to one or more manufacturers 154 or buyers. One or more suppliers 152 may, for example, receive an item from a first supply chain entity of one or more supply chain entities 150 in supply chain network 100 and provide the item to another supply chain entity of one or more supply chain entities 150. Items may comprise, for example, components, materials, products, parts, supplies, or other items that may be used to produce products. In addition, or as an alternative, an item may comprise a supply or resource that is used to manufacture the item but does not become a part of the item. One or more suppliers 152 may comprise automated distribution systems 153 that automatically transport items to one or more manufacturers 154 based, at least in part, on a supply chain plan, a material or capacity reallocation, current and projected inventory levels, and/or one or more additional factors described herein.

One or more manufacturers 154 may be any suitable entity that manufactures at least one product. One or more manufacturers 154 may use one or more items during the manufacturing process to produce any manufactured, fabricated, assembled, or otherwise processed item, material, component, good, or product. In one embodiment, a product represents an item ready to be supplied to, for example, another supply chain entity of one or more supply chain entities 150, such as one or more suppliers 152, an item that needs further processing, or any other item. One or more manufacturers 154 may, for example, produce and sell a product to one or more suppliers 152, another one or more manufacturers 154, one or more distribution centers 156, one or more retailers 158, a customer, or any other suitable entity. One or more manufacturers 154 may comprise automated robotic production machinery 155 that produce products based, at least in part, on a supply chain plan, a material or capacity reallocation, current and projected inventory levels, and/or one or more additional factors described herein.

One or more distribution centers 156 may be any suitable entity that offers to sell or otherwise distributes at least one product to one or more retailers 158 and/or customers. One or more distribution centers 156 may, for example, receive a product from a first supply chain entity of one or more supply chain entities 150 in supply chain network 100 and store and transport the product for a second supply chain entity of one or more supply chain entities 150. One or more distribution centers 156 may comprise automated warehousing systems 157 that automatically transport products to one or more retailers 158 or customers and/or automatically remove an item from, or place an item into, inventory based, at least in part, on a supply chain plan, a material or capacity reallocation, current and projected inventory levels, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers 158 based on computer-generated instructions or automatically by machinery to place products in a desired location.

Although one or more suppliers 152, one or more manufacturers 154, one or more distribution centers 156, and one or more retailers 158 are shown and described as separate and distinct entities, the same entity may simultaneously act as any other one or more suppliers 152, one or more manufacturers 154, one or more distribution centers 156, and/or one or more retailers 158. For example, one or more supply chain entities 150 acting as a manufacturer may produce a product, and the same entity may act as one or more suppliers 152 to supply a product to another one or more supply chain entities 150. Although one example of supply chain network 100 is shown and described, embodiments contemplate any configuration of supply chain network 100, without departing from the scope of the present disclosure.

As shown in FIG. 1, supply chain network 100 comprising reverse sourcing optimization system 110, planning and execution system 120, transportation network 130, archiving system 140, and one or more supply chain entities 150 may operate on one or more computers 160 that are integral to, or separate from, the hardware and/or software that support reverse sourcing optimization system 110, planning and execution system 120, transportation network 130, archiving system 140, and one or more supply chain entities 150. One or more computers 160 may include any suitable input device 162, such as a keypad, mouse, touch screen, microphone, or other device to input information. Output device 164 may convey information associated with the operation of supply chain network 100, including digital or analog data, visual information, or audio information. One or more computers 160 may include fixed or removable computer-readable storage media, including a non-transitory computer-readable medium, magnetic computer disks, flash drives, CD-ROM, in-memory device, or other suitable media to receive output from, and provide input to, supply chain network 100.

One or more computers 160 may include one or more processors 166 and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the methods. An apparatus implementing special purpose logic circuitry, such as, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system, including, but not limited to, a serverless cloud computing system, having processing and storage devices at one or more locations local to, or remote from, reverse sourcing optimization system 110, planning and execution system 120, transportation network 130, archiving system 140, and one or more supply chain entities 150. In addition, each of one or more computers 160 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with reverse sourcing optimization system 110 and archiving system 140. These one or more users may include, for example, an "administrator" handling machine learning model training, administration of cloud computing systems, and/or one or more related tasks within supply chain network 100. In the same or another embodiment, one or more users may be associated with planning and execution system 120 and/or one or more supply chain entities 150.

In one embodiment, reverse sourcing optimization system 110 may be coupled with network 170 using communication link 172, which may be any wireline, wireless, or other link suitable to support data communications between reverse sourcing optimization system 110 and network 170 during operation of supply chain network 100. Planning and execution system 120 may be coupled with network 170 using communication link 174, which may be any wireline, wireless, or other link suitable to support data communications between planning and execution system 120 and network 170 during operation of supply chain network 100. Transportation network 130 may be coupled with network 170 using communication link 176, which may be any wireline, wireless, or other link suitable to support data communications between transportation network 130 and network 170 during operation of supply chain network 100. Archiving system 140 may be coupled with network 170 using communication link 178, which may be any wireline, wireless, or other link suitable to support data communications between archiving system 140 and network 170 during operation of supply chain network 100. One or more supply chain entities 150 may be coupled with network 170 using communication link 180, which may be any wireline, wireless, or other link suitable to support data communications between one or more supply chain entities 150 and network 170 during operation of supply chain network 100. One or more computers 160 may be coupled with network 170 using communication link 182, which may be any wireline, wireless, or other link suitable to support data communications between one or more computers 160 and network 170 during operation of supply chain network 100. Although communication links 172-182 are shown as generally coupling reverse sourcing optimization system 110, planning and execution system 120, transportation network 130, archiving system 140, one or more supply chain entities 150, and one or more computers 160 to network 170, any of reverse sourcing optimization system 110, planning and execution system 120, transportation network 130, archiving system 140, one or more supply chain entities 150, and one or more computers 160 may communicate directly with each other, according to particular needs.

In another embodiment, network 170 includes the Internet and any appropriate local area networks (LANs), metropolitan area networks (MANs), or wide area networks (WANs) coupling reverse sourcing optimization system 110, planning and execution system 120, transportation network 130, archiving system 140, one or more supply chain entities 150, and one or more computers 160. For example, data may be maintained locally to, or externally of, reverse sourcing optimization system 110, planning and execution system 120, transportation network 130, archiving system 140, one or more supply chain entities 150, and one or more computers 160 and made available to one or more associated users of reverse sourcing optimization system 110, planning and execution system 120, transportation network 130, archiving system 140, one or more supply chain entities 150, and one or more computers 160 using network 170 or in any other appropriate manner. For example, data may be maintained in a cloud database at one or more locations external to reverse sourcing optimization system 110, planning and execution system 120, transportation network 130, archiving system 140, one or more supply chain entities 150, and one or more computers 160 and made available to one or more associated users of reverse sourcing optimization system 110, planning and execution system 120, transportation network 130, archiving system 140, one or more supply chain entities 150, and one or more computers 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

Figure 2:
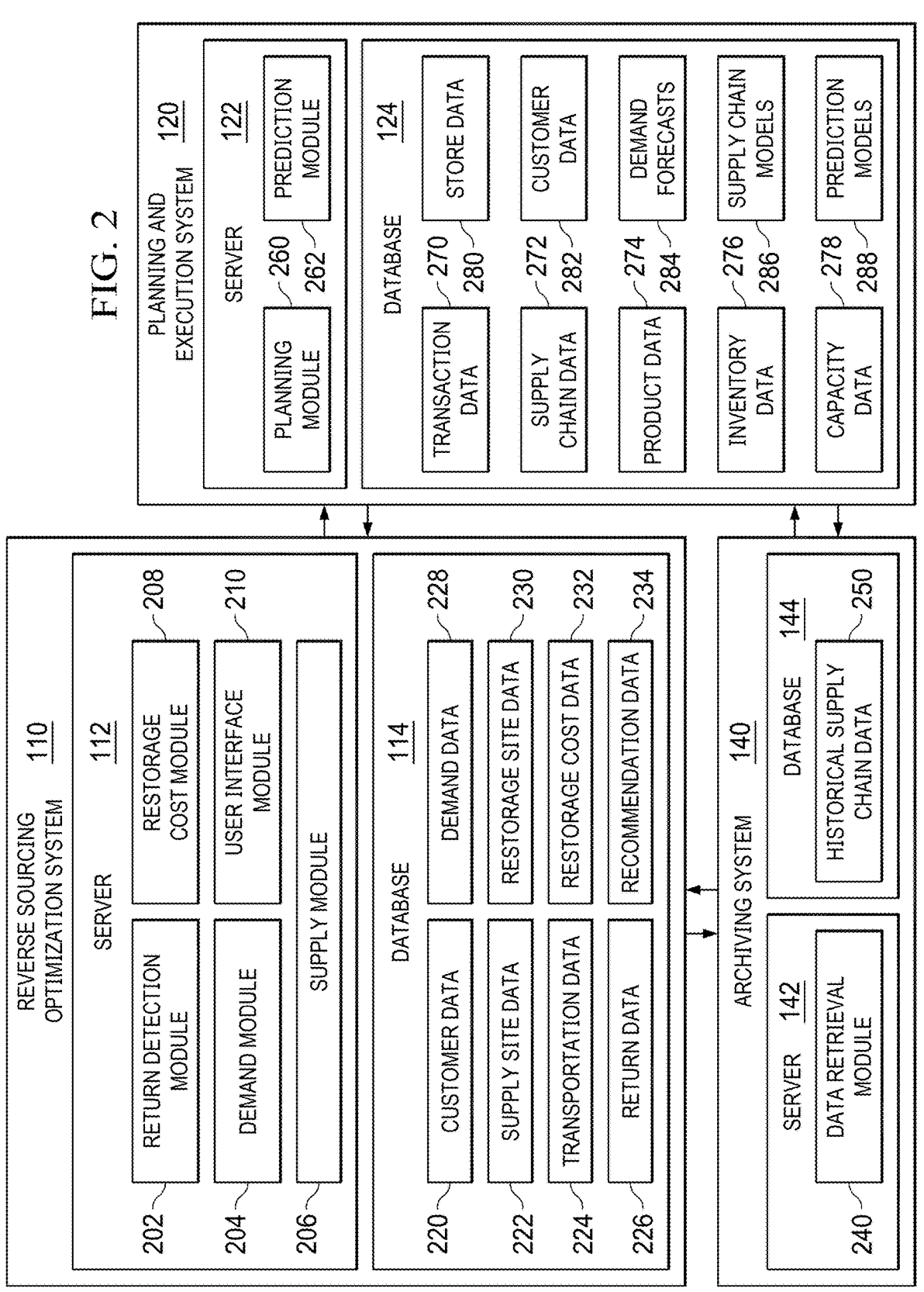
FIG. 2 illustrates the reverse sourcing optimization system, the archiving system, and the planning and execution system of FIG. 1 in greater detail, in accordance with an embodiment.

FIG. 2 illustrates reverse sourcing optimization system 110, archiving system 140, and planning and execution system 120 of FIG. 1 in greater detail, in accordance with an embodiment. Reverse sourcing optimization system 110 may comprise server 112 and database 114, as described above. Although reverse sourcing optimization system 110 is shown as comprising a single server 112 and a single database 114, embodiments contemplate reverse sourcing optimization system 110 comprising any suitable number of servers or databases, serverless computing options, or data stores internal to, or externally coupled with, reverse sourcing optimization system 110, according to particular needs.

Server 112 of reverse sourcing optimization system 110 comprises return detection module 202, demand module 204, supply module 206, restorage cost module 208, and user interface module 210. Although server 112 is shown and described as comprising a single return detection module 202, a single demand module 204, a single supply module 206, a single restorage cost module 208, and a single user interface module 210, embodiments contemplate any suitable number or combination of these located at one or more locations local to, or remote from, reverse sourcing optimization system 110, such as on multiple servers or computers 160 at one or more locations in supply chain network 100. Embodiments of reverse sourcing optimization system 110 may utilize serverless computing options to execute the processes of return detection module 202, demand module 204, supply module 206, restorage cost module 208, and user interface module 210.

In an embodiment, return detection module 202 detects a request from a customer to return an item within supply chain network 100. As described in further detail below, return detection module 202 may detect the return request by monitoring communication channels associated with one or more supply chain entities 150, such as, for example, one or more retailers 158 that sold the item to the customer. Return detection module 202 may further derive a reason for the return, as described in further detail below. In addition, or as an alternative, return detection module 202 may receive the return request from a customer service center or return center associated with supply chain network 100. According to embodiments, return detection module 202 also determines a supply type for the return item based on, for example, a reason for the return, IoT data associated with the customer or one or more supply chain entities 150, or other customer data 220. Supply types may include, for example, items ready for immediate resale (such as, for example, items in original packaging or unpacked items in good condition), items requiring repair or servicing (such as, for example, items that are defective or have been damaged), items that may be split into multiple saleable products (such as, for example, items that comprise multiple distinct components), and the like. In embodiments, return detection module 202 models different supply types, product classes, or other inventory classifications based on a usage level of the return item, such as highly used, moderately used, lightly used, or any other usage level. As explained in further detail below, return detection module 202 may assign a manual quality check to verify the condition of the return item and/or the supply type. Return detection module 202 may utilize one or more artificial intelligence (AI) or machine learning (ML) models trained to perform natural language processing techniques to detect return requests, verify the condition of the return item, and/or determine supply types.

Demand module 204 predicts a demand level for the supply type associated with the return item. For example, demand module 204 may predict the demand for an item in its original unopened packaging, a refurbished version of the item, the item broken down into multiple component parts that may be sold separately, different usage levels of an item, or any other version or model of an item. According to embodiments, demand module 204 identifies one or more potential restorage sites based on, for example, a geographic range, such as a particular radius, region, or the like. The restorage sites may include, for example, one or more distribution centers 156, a retail store of one or more retailers 158, or any other location in supply chain network 100 that may store items. In embodiments where the return item requires repairs to be resalable, demand module 204 may identify the restorage site as a repair or service node. Demand module 204 may predict demand based, at least in part, on impacted customers associated with the potential restorage sites. For example, demand module 204 may derive impacted customers based on historic demand data, such as which customers the demand belonged to in the past. In embodiments, demand module 204 may derive the impact for a specific customer level, a customer category, or a customer status, such as customers with preferred status or that are at a certain membership or loyalty level.

Supply module 206 determines on-hand and expected future inventory for the supply type of the return item. Supply module 206 may consider, for example, the inventory currently available at the potential restorage sites, expected shipments, promised orders for the return item, and already-placed orders for the return item to determine the on-hand and expected future inventory. Supply module 206 may also derive, based on the expected future inventory levels and the demand predicted by demand module 204, a likelihood of service level agreement (SLA) fulfillment for the predicted demand at the one or more potential restorage sites (i.e., the likelihood that the one or more potential restorage sites are able to fulfill SLAs for the predicted demand).

Restorage cost module 208 calculates a restorage cost (or reverse sourcing cost) for restoring the item of the return at the one or more potential restorage sites. As described in further detail below, restorage cost module 208 may consider the derived likelihoods of SLA fulfillment at the one or more potential restorage sites, lost profit or lost customers due to the one or more potential restorage sites missing SLAs, customer value of impacted customers of the one or more potential restorage sites, transportation costs to send a return to the one or more potential restorage sites, or any other data that may affect the restorage costs of items. Restorage cost module 208 may recommend a restorage plan based on the restorage site with the lowest computed restorage cost of the one or more potential restorage sites. According to embodiments, restorage cost module 208 uses a threshold to determine whether to recommend a restorage plan for the return item. For example, restorage cost module 208 may determine to recommend a restorage plan only when the return item has a high demand and/or high value. Upon acceptance of the recommended restorage plan, restorage module 208 may add one or more tasks to a return fulfillment flow or assign tasks to, for example, one or more transportation vehicles 136 of transportation network 130, one or more supply chain entities 150, and/or the like, to complete the recommended restorage plan.

User interface module 210 generates a user interface (UI), such as, for example, a graphical user interface (GUI), that displays return data 226, restorage site data 230, recommendation data 234 visual data relating to restorage costs (including, for example, maps, charts, and/or graphs), or any other visual representations of data of reverse sourcing optimization system 110. According to embodiments, user interface module 210 displays a GUI comprising interactive graphical elements for selecting a recommendation, restorage plan, and/or any other data stored in database 114 of reverse sourcing optimization system 110 and, in response to the selection, displays the selected data on one or more display devices. The data from the UI may also be displayed in other UIs from any other systems or modules throughout supply chain network 100, such as, for example, a transportation manager, a demand forecasting module, or any other integration. In some embodiments, user interface module 210 presents a GUI that enables a user to override a recommended restorage plan. In such embodiments, a hold may be applied on the requested return until a user (such as, for example, an administrator or manager) approves or denies the override or approves a modified version of the restorage plan. Overrides of the restorage plan may be used as feedback for reinforcement learning to further improve reverse sourcing optimization system 110.

Database 114 of reverse sourcing optimization system 110 may comprise, according to embodiments, one or more databases, data stores, or other data storage arrangements at one or more locations local to, or remote from, server 112. In an embodiment, database 114 of reverse sourcing optimization system 110 comprises customer data 220, supply site data 222, transportation data 224, return data 226, demand data 228, restorage site data 230, restorage cost data 232, and recommendation data 234. Although database 114 of reverse sourcing optimization system 110 is shown and described as comprising customer data 220, supply site data 222, transportation data 224, return data 226, demand data 228, restorage site data 230, restorage cost data 232, and recommendation data 234, embodiments contemplate any suitable number or combination of these located at one or more locations local to, or remote from, reverse sourcing optimization system 110, according to particular needs.

In an embodiment, customer data 220 comprises all data associated with customers of supply chain network 100. For example, customer data 220 may include purchase history data of the customers, customer profile data, customer value or preferred status data, customer locations, fulfillment centers or other nodes associated with the customers, return notes or instructions associated with customer returns, return reasons associated with customer returns, or any other data related to the customers. According to embodiments, return detection module 202 uses customer data 220 to determine supply types for items return requests, and demand module 204 uses customer data 220 to predict demand for items and to identify customers impacted by the demand.

Supply site data 222 comprises all data associated with inventory supply locations or supply sites within supply chain network 100. For example, supply sites may include one or more distribution centers 156, warehouses, one or more retail stores 158, transportation hubs, consolidation nodes, or any other location where inventory may be stored temporarily or on a long-term basis. Supply site data 222 may include historical sales data for items stored at the supply sites, historical demand for items stored at the supply sites, pricing and promotional data for items stored at the supply sites, inventory levels for items stored at the supply sites, promised inventory for items stored at the supply sites, purchase orders, or any other data associated with the supply sites. In embodiments, supply module 206 uses supply site data 222 to determine on-hand and expected future inventory levels for potential restorage sites and to derive the likelihood of SLAs being met at the potential restorage sites.

Transportation data 224 includes all data related to transportation of items within supply chain network 100 including, for example, transportation costs. In some embodiments, restorage cost module 208 calculates transportation costs for shipping items based on carrier contracts, shipping distances, and vehicle costs. In other embodiments, transportation cost may be master data that depends on the rates of logistics partners and/or organizations that are not controlled by supply chain network 100. In such embodiments, the transportation cost master data may be hosted on databases separate from reverse sourcing optimization system 110 and transmitted to reverse sourcing optimization system 110 to calculate restorage costs. Restorage cost module 208 may use transportation data 224 to calculate restorage costs for potential restorage sites.

Return data 226 comprises data related to returns and return requests within supply chain network 100. For example, return data 226 may include the items being returned, supply types of the items being returned, a location where the return is to be picked up or sent from, a return reason, an item status or condition, IoT data related to the item, or any other return data. Return data 226 may be generated by return detection module 202 and used by demand module 204 to predict demand for supply types of the return.

Demand data 228 comprises predicted demand for one or more supply types of return items, as described in greater detail above. For example, demand data 228 may comprise demand for all supply types included in an order at all of one or more distribution centers 156, or other restorage sites within a certain distance of a return origination point. Demand data 228 may be generated by demand module 204 and used by restorage cost module 208 to calculate restorage costs for one or more supply types of a return.

Restorage site data 230 comprises data of all restorage sites considered by demand module 204 as potential restorage sites for return items. For example, restorage site data 230 may include storage capacity of restorage sites, current inventory of restorage sites, SLAs of restorage sites, and the derived likelihood of the restorage sites meeting the SLAs based on expected future inventory levels and predicted demand levels. Restorage site data 230 may be generated by supply module 206 and used by restorage cost module 208 to calculate restorage costs for one or more supply types of a return.

Restorage cost data 232 comprises calculated restorage costs as calculated by restorage cost module 208. As discussed in greater detail above, restorage cost module 208 may calculate the restorage cost based on supply types of the return, predicted demand for those supply types at one or more potential restorage sites, predicted inventory levels of the supply types at the one or more potential restorage sites, transportation costs for the return, likelihood of the restorage sites meeting SLAs, and the like.

Recommendation data 234 comprises one or more recommended restorage plans as determined by restorage cost module 208 based on a lowest calculated restorage cost. In embodiments, user interface module 210 uses recommendation data 234 to display one or more recommended restorage plans to a user of reverse sourcing optimization system 110.

As discussed above, archiving system 140 comprises server 142 and database 144. Although archiving system 140 is shown as comprising a single server 142 and a single database 144, embodiments contemplate any suitable number of servers or databases internal to, or externally coupled with, archiving system 140.

Server 142 of archiving system 140 comprises data retrieval module 240. Although server 142 is shown and described as comprising a single data retrieval module 240, embodiments contemplate any suitable number or combination of data retrieval modules located at one or more locations local to, or remote from, archiving system 140, such as on multiple servers or computers 160 at one or more locations in supply chain network 100.

In one embodiment, data retrieval module 240 of archiving system 140 receives historical supply chain data 250 from planning and execution system 120 and one or more supply chain entities 150 and stores received historical supply chain data 250 in archiving system 140 database 144. According to one embodiment, data retrieval module 240 may prepare historical supply chain data 250 for use as training data by checking historical supply chain data 250 for errors and transforming historical supply chain data 250 to normalize, aggregate, and/or rescale historical supply chain data 250 to allow direct comparison of data received from planning and execution system 120, one or more supply chain entities 150, and/or one or more other locations local to, or remote from, archiving system 140. According to embodiments, data retrieval module 240 may receive data from one or more sources external to supply chain network 100, such as, for example, weather data, special events data, social media data, calendar data, and the like, and store the received data as historical supply chain data 250.

Database 144 of archiving system 140 may comprise one or more databases or other data storage arrangements at one or more locations local to, or remote from, server 142. Database 144 of archiving system 140 comprises, for example, historical supply chain data 250. Although database 144 of archiving system 140 is shown and described as comprising historical supply chain data 250, embodiments contemplate any suitable number or combination of data located at one or more locations local to, or remote from, archiving system 140, according to particular needs.

Historical supply chain data 250 comprises historical data received from reverse sourcing optimization system 110, planning and execution system 120, one or more supply chain entities 150, and/or one or more computers 160. Historical supply chain data 250 may comprise, for example, weather data, special events data, social media data, calendar data, and the like. In an embodiment, historical supply chain data 250 may comprise, for example, historic sales patterns, prices, promotions, weather conditions, and other factors influencing future demand of the number of one or more items sold in one or more stores over a time period, such as, for example, one or more days, weeks, months, or years, including, for example, a day of the week, a day of the month, a day of the year, a week of the month, a week of the year, a month of the year, special events, paydays, and the like.

As discussed above, planning and execution system 120 comprises server 122 and database 124. Although planning and execution system 120 is shown as comprising a single server 122 and a single database 124, embodiments contemplate any suitable number of servers or databases internal to, or externally coupled with, planning and execution system 120.

In embodiments, server 122 of planning and execution system 120 comprises planning module 260 and prediction module 262. Although server 122 is shown and described as comprising a single planning module 260 and a single prediction module 262, embodiments contemplate any suitable number or combination of planning modules and prediction modules located at one or more locations local to, or remote from, planning and execution system 120, such as on multiple servers or computers 160 at one or more locations in supply chain network 100.

Database 124 of planning and execution system 120 may comprise one or more databases or other data storage arrangements at one or more locations local to, or remote from, server 122. Database 124 of planning and execution system 120 comprises, for example, transaction data 270, supply chain data 272, product data 274, inventory data 276, capacity data 278, store data 280, customer data 282, demand forecasts 284, supply chain models 286, and prediction models 288. Although database 124 of planning and execution system 120 is shown and described as comprising transaction data 270, supply chain data 272, product data 274, inventory data 276, capacity data 278, store data 280, customer data 282, demand forecasts 284, supply chain models 286, and prediction models 288, embodiments contemplate any suitable number or combination of data located at one or more locations local to, or remote from, planning and execution system 120, according to particular needs.

Planning module 260 of planning and execution system 120 works in connection with prediction module 262 to generate a plan based on one or more predicted retail volumes, classifications, or other predictions. By way of example and not of limitation, planning module 260 may comprise a demand planner that generates a demand forecast for one or more supply chain entities 150. Planning module 260 may generate the demand forecast, at least in part, from predictions and calculated factor values for one or more causal factors received from prediction module 262. By way of a further example, planning module 260 may comprise an assortment planner and/or a segmentation planner that generates product assortments that match causal effects calculated for one or more customers or products by prediction module 262, which may provide for increased customer satisfaction and sales, as well as reduce costs for shipping and stocking products at stores where they are unlikely to sell.

Prediction module 262 of planning and execution system 120 applies samples of transaction data 270, supply chain data 272, product data 274, inventory data 276, store data 280, customer data 282, demand forecasts 284, and other data to prediction models 288 to generate predictions and calculated factor values for one or more causal factors. Prediction module 262 of planning and execution system 120 may predict a volume Y (target) from a set of causal factors X along with causal factors strengths that describe the strength of each causal factor variable contributing to the predicted volume. According to some embodiments, prediction module 262 generates predictions at daily intervals. However, embodiments contemplate longer and shorter prediction phases that may be performed, for example, weekly, twice a week, twice a day, hourly, or the like.

Transaction data 270 of planning and execution system 120 may comprise recorded sales and returns transactions and related data, including, for example, a transaction identification, time and date stamp, channel identification (such as stores or online touchpoints), product identification, actual cost, selling price, sales volume, customer identification, promotions, and/or the like. In addition, transaction data 270 is represented by any suitable combination of values and dimensions, aggregated or disaggregated, such as, for example, sales per week, sales per week per location, sales per day, sales per day per season, or the like.

Supply chain data 272 may comprise any data of one or more supply chain entities 150 including, for example, item data, identifiers, metadata (comprising dimensions, hierarchies, levels, members, attributes, cluster information, and member attribute values), fact data (comprising measure values for combinations of members), business constraints, goals, and objectives of one or more supply chain entities 150.

Product data 274 of database 124 may comprise products identified by, for example, a product identifier (such as a Stock Keeping Unit (SKU), Universal Product Code (UPC), or the like) and one or more attributes and attribute types associated with the product ID. Product data 274 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 276 of database 124 may comprise any data relating to current or projected inventory quantities or states, order rules, or the like. For example, inventory data 276 may comprise the current level of inventory for each item at one or more stocking points across supply chain network 100. In addition, inventory data 276 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 120 accesses and stores inventory data 276 in database 124, which may be used by planning and execution system 120 to place orders, set inventory levels at one or more stocking points, initiate manufacturing of one or more components, or the like.

In embodiments, inventory data 276 may also comprise one or more inventory policies. The inventory policies may comprise any suitable inventory policy describing the reorder point and target quantity, or other inventory policy parameters that set rules for planning and execution system 120 to manage and reorder inventory. The inventory policies may be based on target service level, demand, cost, fill rate, or the like. According to embodiments, the inventory policies comprise target service levels that ensure that a service level of one or more supply chain entities 150 is met with a set probability. For example, one or more supply chain entities 150 may set a service level at 95%, meaning one or more supply chain entities 150 sets the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, planning and execution system 120 may determine a replenishment order according to one or more replenishment rules, which, among other things, indicates to one or more supply chain entities 150 to determine or receive inventory to replace the depleted inventory. By way of example only and not by way of limitation, an inventory policy for non-perishable goods with linear holding and shorting costs comprises a min./max. (s,S) inventory policy. Other inventory policies may be used for perishable goods, such as fruit, vegetables, dairy, and fresh meat, as well as electronics, fashion, and similar items for which demand drops significantly after a next generation of electronic devices or a new season of fashion is released.

Capacity data 278 of database 124 may comprise any data relating to current or projected resource capacity values or states, order rules, or the like. For example, capacity data 278 may comprise the current level of capacity for each task at one or more locations across supply chain network 100. In addition, capacity data 278 may comprise order rules that describe one or more rules or limits on setting a capacity policy, including, but not limited to, a minimum order capacity, a maximum order capacity, a discount, a step-size order capacity, and batch quantity rules. According to some embodiments, planning and execution system 120 accesses and stores capacity data 278 in database 124, which may be used by planning and execution system 120 to place orders, set capacity levels at one or more locations in supply chain network 100, initiate manufacturing of one or more components, or the like.

In embodiments, capacity data 278 may include one or more capacity policies. The capacity policies may comprise any suitable capacity policy describing the reorder point and target quantity, or other capacity policy parameters that set rules for planning and execution system 120 to manage capacity. The capacity policies may be based on target service level, demand, cost, or the like. According to embodiments, the capacity policies comprise target service levels that ensure that a service level of one or more supply chain entities 150 is met with a set probability. For example, one or more supply chain entities 150 may set a service level at 95%, meaning one or more supply chain entities 150 sets the desired capacity level at a level that meets demand 95% of the time.

Store data 280 may comprise data describing the stores of one or more retailers 158 and related store information. Store data 280 may comprise, for example, a store ID, store description, store location details, store location climate, store type, store opening date, lifestyle, store area (expressed in, for example, square feet, square meters, or other suitable measurement), latitude, longitude, and other similar data.

Customer data 282 of planning and execution system 120 may comprise customer identity information, including, for example, customer relationship management data, loyalty programs, and mappings between product purchases and one or more customers so that a customer associated with a transaction may be identified. Customer data 282 may further comprise data relating customer purchases to one or more products, geographical regions, store locations, or other types of dimensions. In an embodiment, customer data 282 may also comprise customer profile information, including demographic information and preferences.

Demand forecasts 284 of database 124 may indicate expected future demand based on, for example, any data relating to past sales, past demand, purchase data, promotions, events, or the like of one or more supply chain entities 150. Demand forecasts 284 may cover a time interval such as, for example, by the minute, by the hour, daily, weekly, monthly, quarterly, yearly, or any other suitable time interval, including substantially in real time. In some embodiments, demand may be modeled as a negative binomial or Poisson-Gamma distribution. According to other embodiments, the model also takes into account shelf-life of perishable goods (which may range from days (e.g., fresh fish or meat) to weeks (e.g., butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. By way of example only and not by way of limitation, an exemplary supermarket may stock twenty thousand items at one thousand locations. When each location of this exemplary supermarket is open every day of the year, planning and execution system 120 needs to calculate approximately $2 \times 10^{\wedge}10$ demand forecasts 284 each day to derive the optimal order volume for the next delivery cycle (e.g., three days).

Supply chain models 286 of database 124 comprise characteristics of a supply chain setup to deliver the customer expectations of a particular customer business model. These characteristics may comprise differentiating factors, such as, for example, MTO (Make-to-Order), ETO (Engineer-to-Order), or MTS (Make-to-Stock). However, supply chain models 286 may also comprise characteristics that specify the supply chain structure in even more detail, including, for example, specifying the type of collaboration with the customer (e.g., Vendor-Managed Inventory (VMI)), from where products may be sourced, and how products may be allocated, shipped, or paid for by particular customers. Each of these characteristics may lead to a different supply chain model. Prediction models 288 comprise one or more of the trained models used by planning and execution system 120 for predicting, among other variables, pricing, targeting, or retail volume, such as, for example, a forecasted demand volume for one or more products at one or more stores of one or more retailers 158 based on the prices of the one or more products.

Figure 3:
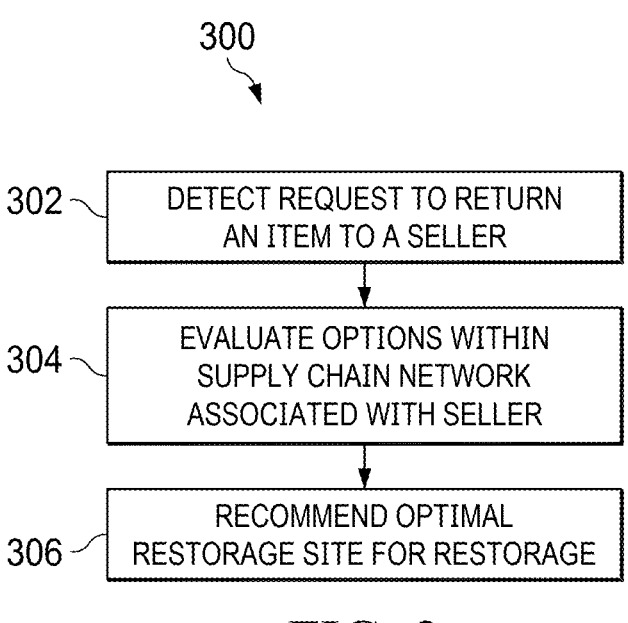
FIG. 3 illustrates a method for recommending restorage of a returned item, in accordance with an embodiment.

FIG. 3 illustrates method 300 for recommending restorage of a returned item, in accordance with an embodiment. Method 300 may be performed by a reverse sourcing optimization system, such as reverse sourcing optimization system 110 of FIG. 1. Method 300 proceeds by one or more activities, which although described in a particular order, may be performed in one or more permutations, combinations, orders, or repetitions, according to particular needs.

At activity 302, reverse sourcing optimization system 110 detects a request from a customer to return an item to a seller. In embodiments, the customer may contact the seller to return the item, which reverse sourcing optimization system 110 may detect by monitoring customer service messages or other communication channels associated with the seller.

At activity 304, reverse sourcing optimization system 110 evaluates possible options within supply chain network 100 to determine an optimal restorage site for the item. In embodiments, reverse sourcing optimization system 110 considers the storage site which last processed the item (e.g., a particular distribution center of one or more distribution centers 156 that shipped the item to the customer, a particular retail store of one or more retailers 158 that sold the item to the customer, or the like) as well as other storage sites or nodes within supply chain network 100. As discussed in further detail below, while evaluating the possible options, reverse sourcing optimization system 110 may consider factors such as whether the item has been assembled, an importance or loyalty status of the customer, a demand that is expected for the item at one or more restorage sites, and/or a storage capacity at the one or more restorage sites.

At activity 306, reverse sourcing optimization system 110 recommends one or more optimal restorage sites for the item to a user of reverse sourcing optimization system 110. In embodiments, the restorage sites may include one or more distribution centers 156 or warehouses associated with the seller, retail stores associated with the seller, one or more manufacturers 154 of the item, a service node within supply chain network 100, a distributor node within supply chain network 100, a break bulk node or consolidation node within supply chain network 100, or any other site within supply chain network 100 where the item may be temporarily stored or distributed.

FIG. 4 illustrates method 400 for modeling restorage costs for reverse sourcing, in accordance with an embodiment. Method 400 may be performed by a reverse sourcing optimization system, such as reverse sourcing optimization system 110 of FIG. 1. Method 400 proceeds by one or more activities, which although described in a particular order, may be performed in one or more permutations, combinations, orders, or repetitions, according to particular needs.

At activity 402, return detection module 202 of reverse sourcing optimization system 110 detects a request from a customer to return an item that was previously purchased from a seller of supply chain network 100. In embodiments, return detection module 202 may monitor one or more communication channels associated with the seller, including, for example, customer service communications, to detect the request. Return detection module 202 may further derive a return reason for the item from the monitored communication channels. Return reasons may include, for example, the customer having a change of mind, the item being defective, the item being damaged during shipping, an exchange for an upgraded item, the item not fitting or being smaller or larger than expected, or any other reason the seller may allow for an item to be returned. According to embodiments, return detection module 202 may utilize various AI or ML models trained to perform NLP techniques (such as, for example, Naïve Bayes, term frequency-inverse document frequency (TF-IDF), and/or the like) to detect the return request and derive the return reason.

At activity 404, return detection module 202 determines a supply type for the return item. The supply type may include, for example, items ready for immediate resale, items requiring repair or servicing, items that may be split into multiple saleable products, and/or the like. Return detection module 202 may also use the results of one or more quality control or quality assurance checks to determine, update, or validate the supply type for the item. According to embodiments, return detection module 202 may determine the supply type from the return reason derived at activity 402, notes or instructions associated with the return (e.g., a note specifying that the item does not turn on), customer service data (e.g., the customer telling a customer service representative over telephone or direct message that part of an item is not working properly), IoT capabilities of the item being returned, or IoT capabilities of the surrounding environment (e.g., when the customer has a smart home or multiple smart devices). In addition, or as an alternative, return detection module 202 may detect the condition of the item using one or more Internet of Things IoT sensors attached to the item.

At activity 406, demand module 204 of reverse sourcing optimization system 110 predicts demand for the return item according to the supply type determined at activity 404. In embodiments, demand module 204 may utilize a radius of distance and transportation SLAs to identify one or more potential restorage sites for the return item. For example, demand module 204 may only consider restorage sites that are within fifty miles or one hundred miles of the origination point of the return, though in other examples any distance threshold may be used, according to particular needs. In some embodiments, demand module 204 may predict demand using a different model for refurbished products than for new products. When the return item may be broken down into individual resaleable components from a singled bundled item or set of items sold together, demand module 204 may predict the demand for every possible combination or permutation of the components.

At activity 408, demand module 204 identifies one or more potential restorage sites for the demand predicted at activity 406. For example, demand module 204 may determine that demand for a particular refurbished product is significantly higher at some distribution centers of supply chain network 100 than others.

At activity 410, supply module 206 of reverse sourcing optimization system 110 determines on-hand and expected future supplies for the determined supply type at each of the potential restorage sites identified at activity 408. In embodiments, supply module 206 may determine the projected availability-to-promise inventory at the potential restorage sites during the period of demand predicted at activity 406 based on existing purchase orders and promised inventory at the potential restorage sites.

At activity 412, supply module 206 derives, based on historical data and the supplies derived at activity 410, a likelihood of the potential restorage sites missing SLAs for the demand predicted at activity 406. For example, when a particular distribution center is projected to have a shortfall of available inventory for an item compared to predicted demand for that item, supply module 206 may derive that there is a high likelihood of the particular distribution center missing the SLA for the item.

At activity 414, restorage cost module 208 of reverse sourcing optimization system 110 calculates a restorage cost for the return item for the potential restorage sites based, at least in part, on the chances of missing the SLAs derived at activity 412, customer value of the potential restorage sites, and transportation costs, to send the item to the potential restorage sites. In embodiments, restorage cost module 208 may calculate the restorage cost using method 500 described below with respect to FIG. 5.

At activity 416, restorage cost module 208 recommends a restorage plan for the return item using the lowest restorage cost option. At activity 418, restorage cost module 208 adds any tasks to a return fulfillment flow for the item required to execute the recommended restorage plan. By way of example only and not by way of limitation, a required task may include performing point of pickup quality control for the item to validate the condition of the item.

FIG. 5 illustrates method 500 for calculating restorage costs, in accordance with an embodiment. Method 500 may be performed by a reverse sourcing optimization system, such as reverse sourcing optimization system 110 of FIG. 1. Method 500 proceeds by one or more activities, which although described in a particular order, may be performed in one or more permutations, combinations, orders, or repetitions, according to particular needs.

At activity 502, demand module 204 of reverse sourcing optimization system 110 identifies one or more potential restorage sites for a return item based on an address of the customer requesting a return. According to embodiments, demand module 204 may identify the potential restorage sites using a geographic radius, such as, for example, all distribution centers of one or more distribution centers 156 within ten miles of the address of the customer requesting the return.

At activity 504, restorage cost module 208 of reverse sourcing optimization system 110 calculates a missed profit due to lost sales under current supply chain conditions at the one or more potential restorage sites, such as one or more distribution centers 156. In embodiments, restorage cost module 208 may consider various data streams when calculating the missed profit, including, for example, customer profile data, price and promotional data for the item being returned, a purchase history for the item being returned, and/or a purchase history for customers of the one or more potential restorage sites. By way of example only and not by way of limitation, when a particular supply chain has two potential distribution centers where the item may be restored, restorage cost module 208 may determine, based on customer profile data and purchase history data of customers, that a first distribution center has more "gold" level or preferred customers than a second distribution center, and that those gold level customers are likely to place an order for the item in the next few. In such an example, restorage cost module 208 may determine that restoring the item at the second distribution center may lead to an inventory shortage at the first distribution center, resulting in lost sales and reduced profit compared to restoring the item at the first distribution center.

At activity 506, restorage cost module 208 calculates an expected business loss due to lost customers from inventory shortages under current supply chain conditions at the one or more potential restorage sites. In embodiments, restorage cost module 208 may consider various data streams when predicting the business loss, including, for example, customer profile data, a purchase history for the item being returned, and/or a purchase history for customers of the one or more potential restorage sites.

At activity 508, restorage cost module 208 calculates a transportation cost for returning the item to the one or more potential restorage sites. According to embodiments, to calculate the transportation cost, restorage cost module 208 may consider geography (e.g., a distance between the address of the return and the potential restorage site, taxes incurred by crossing international or intranational borders, and the like), carriers used to perform the return, contractual obligations of a seller of the item or a supply chain operator to carriers or other entities, special handling or shipping requirements of the item, or any other factor which may impact the transportation cost for the item.

At activity 510, restorage cost module 208 calculates a restorage cost of the item at the one or more potential restorage sites using a logistic regression model. Restorage cost module 208 may consider all restorage costs, including the missed profits calculated at activity 504, the expected business loss calculated at activity 506, and the transportation cost calculated at activity 508, when calculating the total restorage cost.

FIG. 6 illustrates example method 600 for modeling restorage cost for reverse sourcing of regular items, in accordance with an embodiment. Method 600 may be performed by a reverse sourcing optimization system, such as reverse sourcing optimization system 110 of FIG. 1. Method 600 proceeds by one or more activities, which although described in a particular order, may be performed in one or more permutations, combinations, orders, or repetitions, according to particular needs.

At activity 602, return detection module 202 of reverse sourcing optimization system 110 detects a return request from a customer. At activity 604, return detection module 202 identifies a supply type for the return item. For example, the item may be in its original packaging, resulting in a supply type of packed, or the item may have been removed from its original packaging, which may result in several different supply types, including unpacked but in good condition, damaged, or defective, depending on the reason for return.

At activity 606, demand module 204 of reverse sourcing optimization system 110 predicts a demand for the item at one or more potential restorage sites in supply chain network 100. In this example, demand module 204 predicts demand for the item at three potential distribution centers of supply chain network 100 (DC1, DC2, and DC3).

At activity 608, supply module 206 of reverse sourcing optimization system 110 derives a likelihood of each potential restorage site meeting respective SLAs. According to embodiments, supply module 206 derives the likelihood of the potential restorage sites meeting the respective SLAs by determining the current on-hand inventory and expected future supply for the item at each of the potential restorage sites and comparing the on-hand inventory and expected future supply to the demand predicted at activity 606. In this example, supply module 206 determines that DC1 has three of the item on-hand, DC2 has two of the item on-hand, and DC3 has four of the item on-hand, and that each of DC1, DC2 and DC3 has the capacity to store a maximum quantity of four of the item. Supply module 206 thus derives that DC2 has the highest likelihood of missing SLAs due to having too few of the item in inventory.

At activity 610, restorage cost module 208 of reverse sourcing optimization system 110 calculates a restorage cost for each of the potential restorage sites and, based on the calculated restorage costs, recommends a restorage plan to a user. According to embodiments, restorage cost module 208 recommends the restorage site that has the lowest calculated restorage cost, which may include, for example, a restorage site that is not the source DC for the initial item order or a DC with a higher transportation cost than other DCs. In this example, since DC2 has the highest likelihood of missing an SLA, restorage cost module 208 calculates the lowest restorage cost for restoring the item at DC2. Thus, restorage cost module 208 recommends a restorage plan using DC2 as the restorage site for the item.

To further illustrate the operation of method 600, the following non-limiting example is provided. In this example, Customer A orders a smart TV from Seller B, which is shipped from Distribution Center C to the house of Customer A. Upon receiving the smart TV, and without opening or installing the smart TV, Customer A decides to upgrade to a more expensive model and requests an exchange, which return detection module 202 detects as a return request at activity 602. Since Customer A has not opened or installed the smart TV, return detection module 202 identifies the supply type as an item ready for immediate resale at activity 604. At activity 606, demand module 204 predicts high demand for the smart TV at Distribution Center D for the upcoming days compared to Distribution Center C. Since the returned smart TV is in new condition and Distribution Center D is predicted to have high upcoming demand, at activity 608, supply module 206 derives that the likelihood of Distribution Center D missing SLAs is higher than the likelihood of Distribution Center C. At activity 610, restorage cost module 208 recommends shipping the smart TV from the house of Customer A to Distribution Center D, which enables Seller B to make a sale of the returned smart TV that would have been lost using existing reverse logistics systems.

FIG. 7 illustrates example method 700 for modeling the impact of restorage costs for reverse sourcing of defective items, in accordance with an embodiment. Method 700 may be performed by a reverse sourcing optimization system, such as reverse sourcing optimization system 110 of FIG. 1. Method 700 proceeds by one or more activities, which although described in a particular order, may be performed in one or more permutations, combinations, orders, or repetitions, according to particular needs.

At activity 702, return detection module 202 of reverse sourcing optimization system 110 detects a request from a customer to return an item. At activity 704, return detection module 202 determines a supply type for the return item, such as, for example, a supply type of packed for an item still in original packaging, or a supply type of unpacked but in good condition, damaged, or defective for an item that has been removed from its original packaging.

At activity 706, return detection module 202 performs an AI-supported quality control check. In embodiments, return detection module 202 may assign a manual quality check as a step to a fulfillment process for the item. Based on the quality control checks, demand module 204 of reverse sourcing optimization system 110 may identify one or more potential restorage sites for the item and restorage cost module 208 may recommend a restorage plan at activity 708. For example, when the quality control checks indicate that the item is in good condition or may be repaired to a resalable condition, demand module 204 may identify one or more repair or service nodes as the one or more potential restorage sites for items that may be refurbished. As another example, when the item is in resalable condition, demand module 204 may identify one or more distribution centers 156 as potential restorage sites and restorage cost module 208 may recommend a restorage plan by calculating a restorage cost for each of the potential restorage sites. However, when the quality control checks indicate that the item is defective and cannot be repaired or refurbished, demand module 204 may determine to send the defective item to one or more distribution centers 156 (or other site) associated with one or more manufacturers 154 that manufactured the item. In such embodiments, restorage cost module 208 may assign one or more tasks to facilitate return of the item to one or more distribution centers 156 (or other site) associated with one or more manufacturers 154 of the item, such as, for example, assigning one or more transportation vehicles 136 of transportation network 130 to ship the item.

To further illustrate the operation of method 700, consider the following non-limiting example is provided. In this example, Customer E orders a headset that is manufactured by Manufacturer F from Seller G. Seller G ships the headset and, upon receipt, Customer E notices that the headset does not work. Customer E requests a return, specifying that the return reason is that the item is defective, which return detection module 202 detects at activity 702. Since Customer E has specified that the item is defective as the return reason, return detection module 202 determines the supply type as defective at activity 704. At activity 706, return detection module 202 detects that headset is indeed not working as intended using IoT sensors attached to the headset. Based on return reason, demand module 204 identifies Manufacturer F as the potential restorage site, and restorage cost module 208 recommends shipping the headset to Manufacturer F after on-the-spot quality control to validate the status of the headset at activity 708. Restorage cost module 208 further assigns a pickup resource (such as a person picking up the headset at a house or workplace of Customer E) who is qualified to perform the quality control. After quality control confirms the condition, restorage cost module 208 may recommend shipping the headset from the house directly to Manufacturer F, which saves Seller E a substantial operational cost in storing and shipping the headset, and Manufacturer F receives the defective item in significantly less time when compared to existing reverse logistics systems.

Reference in the foregoing specification to "one embodiment", "an embodiment", or "some embodiments" means that a particular correlated factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for modeling restorage cost for reverse sourcing of regular items, comprising:
   a computer, comprising a processor and a memory, the computer configured to:
      detect a return request from a customer for an item;
      identify a supply type for the item;
      predict a demand for the item at one or more potential restorage sites in a supply chain network;
      derive a likelihood of one or more potential restorage sites meeting one or more respective service level agreements; and
      calculate a restorage cost for each of the one or more potential restorage sites and, based on the calculated restorage costs, recommend a restorage plan to a user; and
   automated robotic production machinery configured to:
      produce products based, at least in part, on the restorage plan.

2. The system of claim 1, wherein the likelihood is based, at least in part, on an inventory level.

3. The system of claim 1, wherein the computer is further configured to:
   assign a manual quality check to verify a condition of the item.

4. The system of claim 1, wherein the supply type comprises one or more of:
   items ready for immediate resale, items requiring repair or servicing and items that may be split into multiple saleable products.

5. The system of claim 4, wherein the supply type is based on a usage level of the item.

6. The system of claim 5, wherein the computer is further configured to:
   identify the one or more potential restorage sites based, at least in part, on a geographic range.

7. The system of claim 1, wherein the recommended restorage plan is based, at least in part, on a threshold value of the item.

8. A computer-implemented method for modeling restorage cost for reverse sourcing of regular items, comprising:

detecting, by a computer comprising a processor and a memory, a return request from a customer for an item;

identifying, by the computer, a supply type for the item;

predicting, by the computer, a demand for the item at one or more potential restorage sites in a supply chain network;

deriving, by the computer, a likelihood of one or more potential restorage sites meeting one or more respective service level agreements;

calculating, by the computer, a restorage cost for each of the one or more potential restorage sites and, based on the calculated restorage costs, recommend a restorage plan to a user; and producing, by automated robotic production machinery, products based, at least in part, on the restorage plan.

9. The computer-implemented method of claim 8, further comprising:

wherein the likelihood is based, at least in part, on an inventory level.

10. The computer-implemented method of claim 8, further comprising:

assigning, by the computer, a manual quality check to verify a condition of the item.

11. The computer-implemented method of claim 8, wherein the supply type comprises one or more of:

items ready for immediate resale, items requiring repair or servicing and items that may be split into multiple saleable products.

12. The computer-implemented method of claim 8, wherein the supply type is based on a usage level of the item.

13. The computer-implemented method of claim 8, further comprising:

identifying, by the computer, the one or more potential restorage sites based, at least in part, on a geographic range.

14. The computer-implemented method of claim 8, wherein the recommended restorage plan is based, at least in part, on a threshold value of the item.

15. A non-transitory computer-readable medium embodied with software for modeling restorage cost for reverse sourcing of regular items, the software when executed is configured to:

detect, by a computer comprising a processor and a memory, a return request from a customer for an item;

identify a supply type for the item;

predict a demand for the item at one or more potential restorage sites in a supply chain network;

derive a likelihood of one or more potential restorage sites meeting one or more respective service level agreements;

calculate a restorage cost for each of the one or more potential restorage sites and, based on the calculated restorage costs, recommend a restorage plan to a user; and produce, by automated robotic production machinery, products based, at least in part, on the restorage plan.

16. The non-transitory computer-readable medium of claim 15, wherein the likelihood is based, at least in part, on an inventory level.

17. The non-transitory computer-readable medium of claim 15, wherein the software when executed is further configured to:

assign a manual quality check to verify a condition of the item.

18. The non-transitory computer-readable medium of claim 15, wherein the supply type comprises one or more of:

items ready for immediate resale, items requiring repair or servicing and items that may be split into multiple saleable products.

19. The non-transitory computer-readable medium of claim 15, wherein the supply type is based on a usage level of the item.

20. The non-transitory computer-readable medium of claim 15, wherein the software when executed is further configured to:

identify the one or more potential restorage sites based, at least in part, on a geographic range.

* * * * *